United States Patent
Huang

(10) Patent No.: US 10,012,847 B1
(45) Date of Patent: Jul. 3, 2018

(54) LENS EXCHANGE STRUCTURE OF SPECTACLES

(71) Applicant: TSAIR YUARN INDUSTRIAL CO., LTD., Tainan (TW)

(72) Inventor: Pao-Ming Huang, Tainan (TW)

(73) Assignee: Tsair Yuarn Industrial Co., Ltd., Tainan (TW)

( * ) Notice: Subject to any disclaimer, the term of this patent is extended or adjusted under 35 U.S.C. 154(b) by 4 days.

(21) Appl. No.: 15/450,219

(22) Filed: Mar. 6, 2017

(51) Int. Cl.
*G02C 1/04* (2006.01)
*G02C 5/02* (2006.01)

(52) U.S. Cl.
CPC ............ *G02C 1/04* (2013.01); *G02C 5/02* (2013.01); *G02C 2200/08* (2013.01); *G02C 2200/16* (2013.01); *G02C 2200/32* (2013.01)

(58) Field of Classification Search
CPC .................................. G02C 1/06; G02C 1/04
USPC .................................................. 351/103–109
See application file for complete search history.

(56) References Cited

U.S. PATENT DOCUMENTS 8,777,403 B2 * 7/2014 Huang ................... G02C 1/04
351/103

FOREIGN PATENT DOCUMENTS

TW  M487450 U  10/2014
TW  M496142 U  2/2015

* cited by examiner

*Primary Examiner* — Hung Dang
(74) *Attorney, Agent, or Firm* — Rosenberg, Klein & Lee

(57) ABSTRACT

A lens exchange structure of spectacles is disclosed. The lens exchange structure comprises a lens frame, a lens, a pressing part, and an elastic part. A channel is disposed on the bottom of the lens frame. An intercalation hole is disposed on the inner side of the central nose bridge. The pressing part is inserted into the intercalation hole. The pressing part has hook parts and an accommodating groove for receiving the elastic part. One terminal of the elastic part is against the wall of the lens frame, and the lens has positioning holes for receiving the hook parts. Therefore, a pressing action may be used to compress or release the elastic part to let the hook parts correspondingly hook in or release from the positioning holes. The effect of easy lens assembling and exchanging as well as stable positioning can be accomplished.

4 Claims, 5 Drawing Sheets

LENS EXCHANGE STRUCTURE OF SPECTACLES

BACKGROUND

Field of Invention

The disclosure relates to a lens exchange structure of spectacles. More particularly, the disclosure relates to a lens exchange structure using pressing to catch, position, or release lens in or from a lens frame.

Description of Related Art

Generally, conventional spectacles include a lens frame, two lenses and two temples pivotally connected to the two sides of the lens frame. Two intercalating slots are disposed on the inner edges of the lens frame for combining the two lenses. When the lenses are to be assembled, the lenses are forced to be inserted into the intercalating slots by using the elasticity of the materials. However, the lenses are usually brittle, and thus the lenses may be broken or the lens frame may be damaged when the lenses are assembled or disassembled.

In the prior arts, there are many spectacles having lenses replacing structures, so that the lenses can be easily changed and the lenses and lens frames won't be damaged. In patent TW M496142U, eyeglasses with easily replaceable lens, the eyeglasses comprise the following parts. A lens frame comprises a vertical separation having a first end and a second end. Two connectors are respectively located on the first end and the second end. Supporting slots are respectively located on the inner sides of the connectors. The connectors each comprises an outer surface, an inner surface, and a through hole extended from the outer surface to the inner surface. A guiding slot is disposed on the outer surface along a vertical direction. At least a lens is assembled in the supporting slot of the lens frame. A notch is disposed on one side of the lens combined in the supporting slot of the connector. The notch is aligned with the through hole of the connector. Two temples each comprises a front end and a rear end, which are separated. The front ends of the temples are pivotally connected to the outer side of the connectors, so that the temples can be located at an unfolded position and a folded position. Two push buttons each comprises a body and a column extending outwards from the inner side of the body. The bodies are received by the guiding slots of the corresponding connectors. The columns penetrate the corresponding through holes to move between the first position and the second position on the vertical direction. When the columns each is at the first position, the columns are respectively inserted into the corresponding notches of the lenses. When the columns each is at the second position, the columns are released from the corresponding notches of the lenses. Especially, when the temples are at the unfolded positions, the columns of the pushing buttons cannot be moved to the second positions. When the temples are at the folded positions, the columns of the pushing buttons can be moved between the first positions and the second positions.

Patent TW M487450U disclosed an assembly structure of eyeglasses. The structure comprises a lens frame, and an intercalation channel is disposed on a bottom of the lens frame. A recessed joining part is disposed on the center of the lens frame. Catching slots are disposed on the front side and the rear side of the joining part. The top edge of a one-piece lens is inserted into the intercalation channel, and a recessed part is disposed on the central bottom of the lens to correspond to the nose of a human body. A first connecting block is disposed on the rear side of the lens frame and has a buckle slot. A first buckle is disposed on the first connecting block to hook the recessed part of the lens. A second connecting block is disposed on the rear side of the first connecting block and has a second buckle to hook the second joining part of the lens frame. A buckling body is disposed on the second connecting block to hook the first connecting block.

Although the structures disclosed above all can replace the lenses, one of them needs to push the pushing buttons on two sides, and thus the lenses have to be replaced one by one to waste more time. Moreover, the pushing buttons are protruded from the lens frame and located on the lateral sides of the eyes to cause dangers to the user. The other of them needs to use the two connecting blocks on the nose bridge to cooperatively assemble the structure. Therefore, the assembling procedure is not convenient. Moreover, if the connecting blocks are lost during the assembling process, the connecting blocks cannot be correspondingly replaced.

Therefore, in view of the drawbacks above, the inventors develop this invention by the many-year manufacturing and design experience and knowledge in the related fields and ingenuity to provide a lens exchange structure of spectacles to accomplish the better practical values.

SUMMARY

In one aspect of this invention, a lens exchange structure of spectacles is provided. More particularly, the disclosure relates to a lens exchange structure using pressing way to catch, position, or release lens in or from a lens frame.

The main aspects and the effects of this invention are accomplished by the following technical means.

The lens exchange structure comprises a lens frame, a lens, a pressing part, and an elastic part.

A channel is disposed on a bottom of the lens frame. An intercalation hole is disposed on the inner side of the central nose bridge. The pressing part is inserted into the intercalation hole. The pressing part has hook parts and an accommodating groove for receiving the elastic part. One terminal of the elastic part is against the wall of the lens frame, and the lens has positioning holes for receiving the hook parts. Therefore, a pressing action may be used to compress or release the elastic part to let the hook parts correspondingly hook in or release from the positioning holes. The effect of easy lens assembling and exchanging as well as stable positioning can be accomplished.

In the lens exchange structure above, a through hole is disposed on one side, corresponding to the intercalation hole, of the channel of the lens frame. A movable positioning slot is disposed at a position of the through hole, corresponding to the pressing part. A locating pin is correspondingly inserted into the movable positioning slot and the through hole. The locating pin is used to position the pressing part in the intercalation hole. Thus, the length of the positioning slot and the locating pin may provide the movement of the pressing part.

In the lens exchange structure above, a protrusion is disposed on an inner wall of the intercalation hole of the lens frame to limit and position the elastic part.

In light of the foregoing embodiments of this invention disclosing the structures and use, this invention has the following advantages, comparing with the conventional structures:

1. In the lens exchange structure of this invention, the pressing techniques uses the pressing part to fix and release the hook parts to accomplish the effects of assembling and disassembling the lens exchange structure.

2. In the lens exchange structure of this invention, the lens may be easily assembled and changed to have the effect of easy operation.

3. In the lens exchange structure of this invention, the fix and combination of the positioning holes and the hook parts can steadily position the lens to accomplish the effect of the effective catch.

DETAILED DESCRIPTION

To more completely and clearly illustrate the technical means and effects of this invention, the detailed descriptions are set forth below. Please refer to the disclosed figures and the reference numbers.

Figure 1:
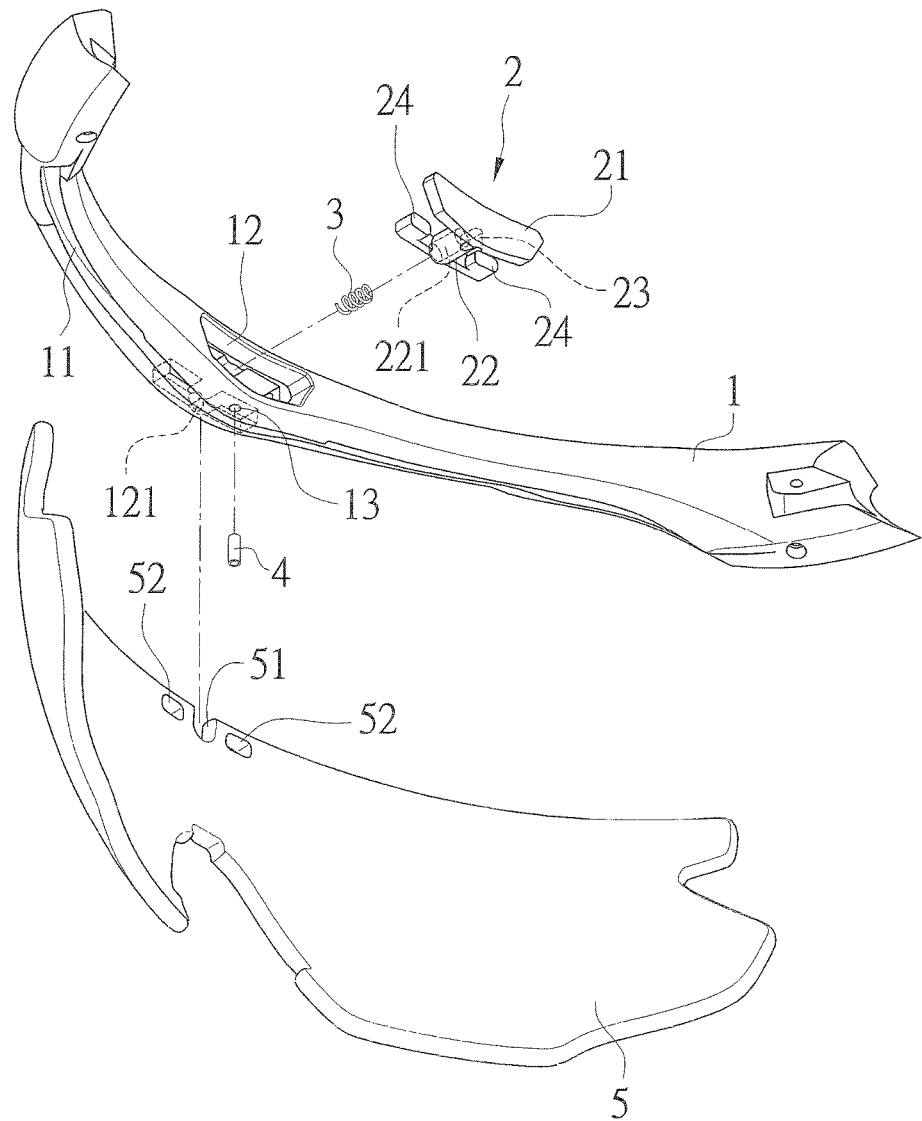
FIG. 1 is a perspective diagram showing a disassembled structure of this invention.
Figure 2:
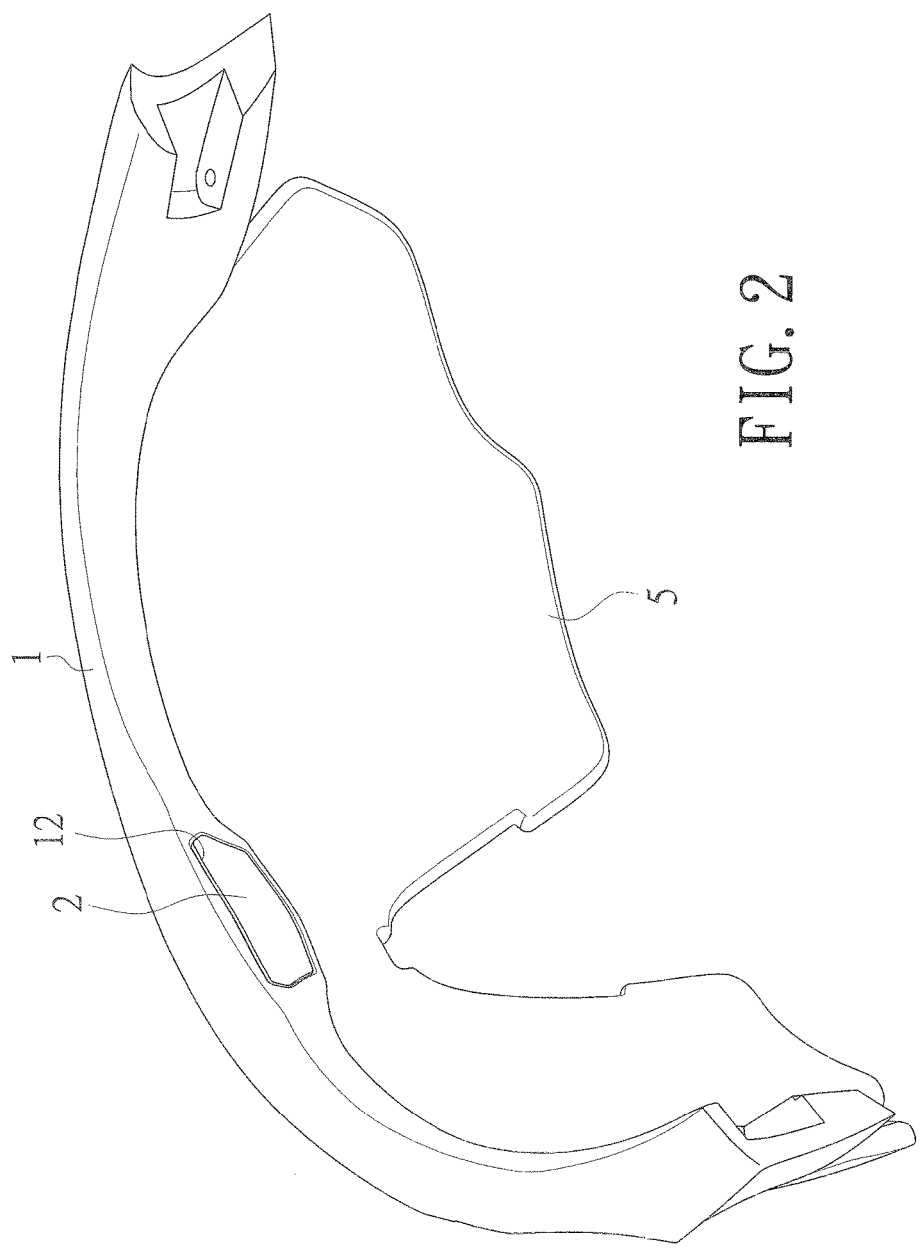
FIG. 2 is a perspective diagram showing an assembled structure of this invention.

Please refer to FIGS. 1-2, which are the diagrams showing the lens exchange structure of spectacles according to this invention. The lens exchange structure comprises a lens frame 1, a pressing part 2, an elastic part 3, a locating pin 4, and a lens 5.

In the lens frame 1, a channel 11 is disposed on a bottom of the lens frame 1. An intercalation hole 12 is disposed on the inner side of the central nose bridge. A through hole 13 is disposed on one side of the channel 11 to correspond to the intercalation hole 12.

The pressing part 2 is correspondingly inserted into the intercalation hole 12. The pressing part 2 mainly has a pressing portion 21. A connection rod 22 is disposed on the center of the pressing portion 21. A movable positioning slot 23 is disposed below the connection rod 22 to correspond to the through hole 13 of the lens frame 1. An accommodating groove 221 is disposed on the terminal center of the connection rod 22. Moreover, two hook parts 24 are disposed on the two terminals of the connection rod 22.

The elastic part 3 is correspondingly assembled in the accommodating groove 221 of the pressing part 2. The other terminal of the elastic part 3 is against an inner wall of the intercalation hole 12 of the lens frame 1.

The locating pin 4 is correspondingly inserted into the through hole 13 of the lens frame 1 and the movable positioning slot 23 of the pressing part 2 to press and position the pressing part 2 in the intercalation hole 12.

The lens 5 is correspondingly inserted in the channel 11 of the lens frame 1. A groove 51 is disposed at the connection rod 22 of the pressing part 2 to correspond to the top periphery of the lens 5. Two positioning holes 52 are located on two sides of the groove 51 to correspond to the hook parts 24.

Please refer to FIGS. 1-5. When the lens exchange structure is assembled, a one-piece lens may be used as the lens 5. A protrusion 121 is disposed on the inner wall of the lens frame 1 for being against the elastic part 3. After the accommodating groove 221 of the pressing part 2 is inserted by the elastic part 3, the pressing part 2 is inserted into the intercalation hole 12. At this time, the protrusion 121 may position the elastic part 3. The locating pin 4 is correspondingly inserted into the through hole 13 of the lens frame 1 and the movable positioning slot 23 of the pressing part 2 to fix the pressing part 2 in the intercalation hole 12.

Figure 3:
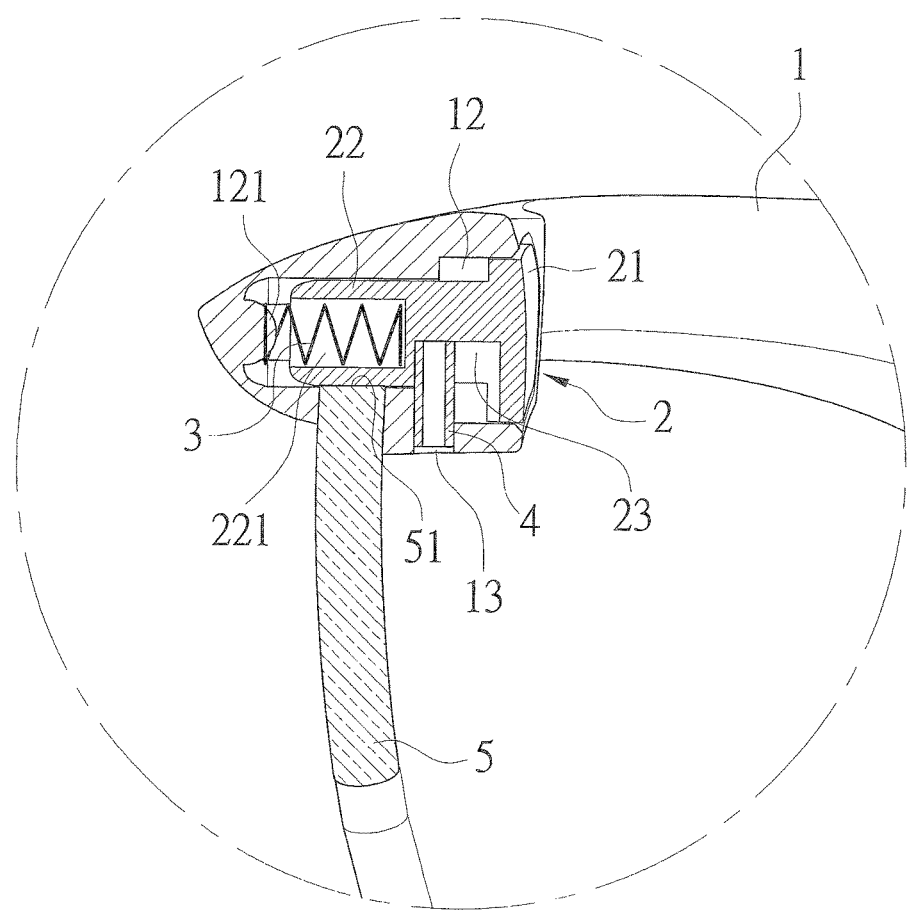
FIG. 3 is a longitudinal cross-sectional diagram showing the lens assembled in this invention.
Figure 4:
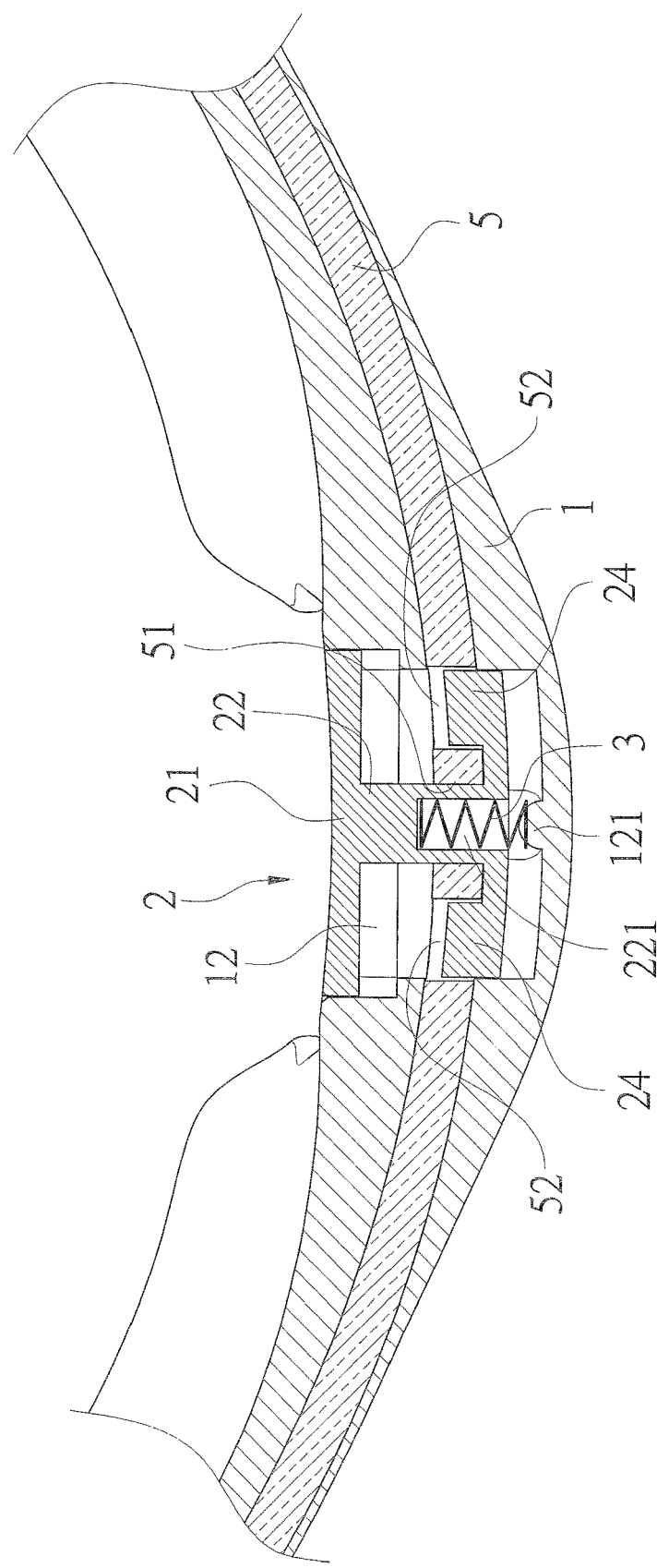
FIG. 4 is a horizontal cross-sectional diagram showing the lens assembled in this invention.

Next, when the lens 5 is assembled or changed, the pressing portion 21 of the pressing part 2 is pressed down to compress the elastic part 3. The hook parts 24 of the pressing part 2 move inward and position in the channel 11. At this time, the lens 5 is inserted into the lens frame 1 from the channel 11, and the groove 51 of the lens 5 intercalates the connection rod 22. Afterwards, the pressing part 2 is released to return the pressing part 2, and the hook parts 24 hook the positioning holes 52 to stably assemble the lens 5, as shown in FIGS. 3-4.

Figure 5:
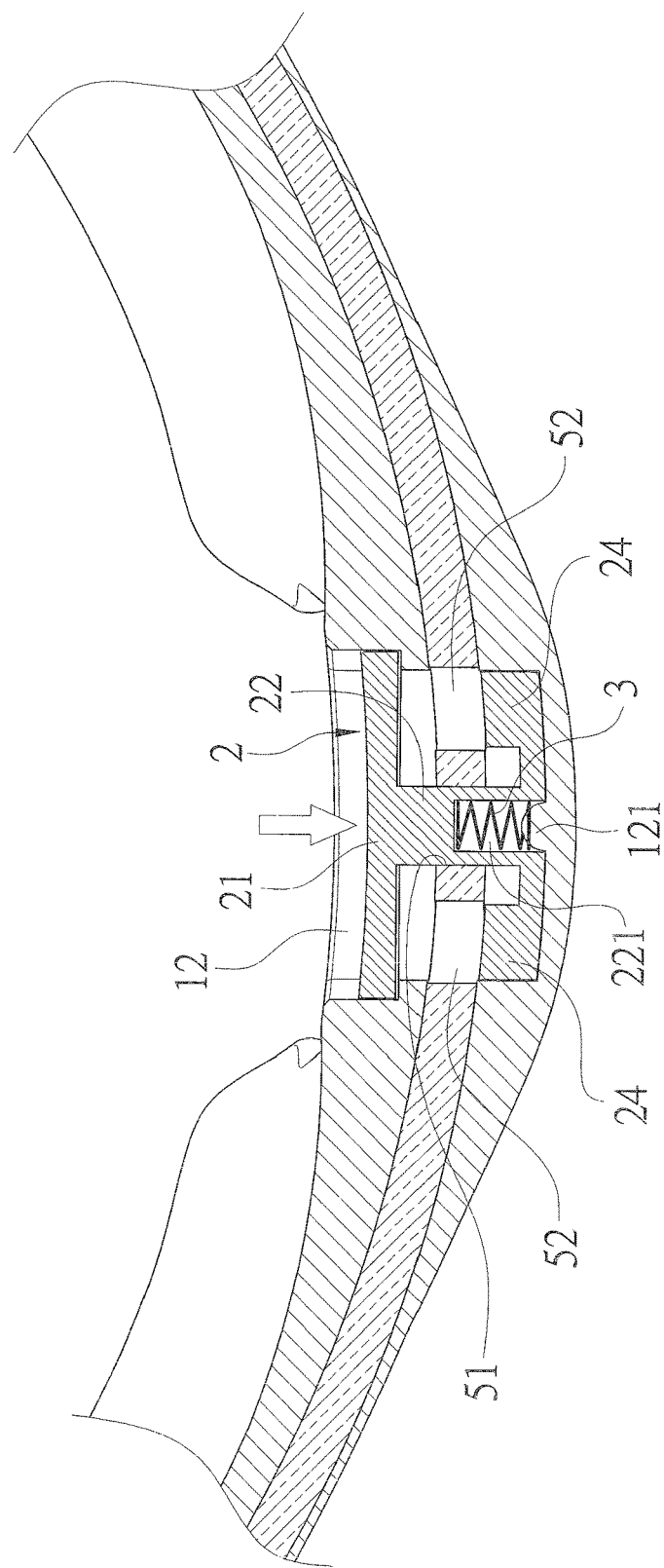
FIG. 5 is a horizontal cross-sectional diagram showing the state of being pressed to release from the limiting position according to this invention.

When the lens 5 is changed, only the pressing portion 21 of the pressing part 2 is pressed down to release the hook parts 24 from the positioning holes 52 of the lens 5, as shown in FIG. 5.

In light of the foregoing embodiments of this invention disclosing the structures and use, this invention has the following advantages, comparing with the conventional structures:

1. In the lens exchange structure of this invention, the pressing techniques uses the pressing part to fix and release the hook parts to accomplish the effects of assembling and disassembling the lens exchange structure.

2. In the lens exchange structure of this invention, the lens may be easily assembled and changed to have the effect of easy operation.

3. In the lens exchange structure of this invention, the fix and combination of the positioning holes and the hook parts can steadily position the lens to accomplish the effect of the effective catch.

What is claimed is:

1. A lens exchange structure of spectacles, comprising:
   a lens frame comprising a channel disposed on a bottom of the lens frame, an intercalation hole disposed on an inner side of a central nose bridge, and a through hole disposed on one side of the channel to correspond to the intercalation hole;
   a pressing part correspondingly inserted into the intercalation hole and having a pressing portion, wherein the pressing part comprises a connection rod disposed on the center of the pressing portion, a movable positioning slot disposed below the connection rod to correspond to the through hole of the lens frame, an accommodating groove disposed on a terminal center of the connection rod, and two hook parts disposed on the two terminals of the connection rod;
   an elastic part correspondingly assembled in the accommodating groove of the pressing part, and another terminal of the elastic part being against an inner wall of the intercalation hole of the lens frame;
   a locating pin correspondingly inserted into the through hole of the lens frame and the movable positioning slot of the pressing part to press and position the pressing part in the intercalation hole; and
   a lens correspondingly inserted in the channel of the lens frame, wherein the lens comprises a groove disposed at the connection rod of the pressing part to correspond to a top periphery of the lens, and two positioning holes located on two sides of the groove to correspond to the hook parts.

2. The lens exchange structure of claim 1, wherein the lens is a one-piece lens.

3. The lens exchange structure of claim 2, further comprising a protrusion disposed on the inner wall of the intercalation hole of the lens frame to limit and position the elastic part.

4. The lens exchange structure of claim 1, further comprising a protrusion disposed on the inner wall of the intercalation hole of the lens frame to limit and position the elastic part.

* * * * *